United States Patent [19]
Kahlman

[11] Patent Number: 5,741,762
[45] Date of Patent: Apr. 21, 1998

[54] LUBRICATED ROLLING CONTACT DEVICES, A METHOD FOR LUBRICATING ROLLING CONTACT DEVICES, AND A COMPOSITION FOR LUBRICATING ROLLING CONTACT DEVICES

[75] Inventor: Lars Kahlman, Göteborg, Sweden

[73] Assignee: SKF Nova AB, Göteborg, Sweden

[21] Appl. No.: 810,817

[22] Filed: Mar. 6, 1997

[30] Foreign Application Priority Data

Mar. 7, 1996 [SE] Sweden ................................. 9600881

[51] Int. Cl.$^6$ ...................... C10M 103/06; F16C 33/56
[52] U.S. Cl. ...................... 508/108; 508/165; 384/492; 384/907.1
[58] Field of Search ...................... 508/165, 100, 508/108; 384/492, 907.1

[56] References Cited

U.S. PATENT DOCUMENTS

| | | | |
|---|---|---|---|
| 2,285,453 | 6/1942 | Merkle | 508/165 |
| 3,709,573 | 1/1973 | Orkin et al. | 384/368 |
| 3,929,396 | 12/1975 | Orkin et al. | 508/100 |
| 4,824,262 | 4/1989 | Kamigaito et al. | |
| 4,934,837 | 6/1990 | Kawamura | |
| 5,067,826 | 11/1991 | Lemelson | |
| 5,290,070 | 3/1994 | Deits et al. | 384/492 |
| 5,575,571 | 11/1996 | Takebayashi et al. | 384/492 |

FOREIGN PATENT DOCUMENTS

| | | |
|---|---|---|
| 5-59384 | 3/1993 | Japan . |
| 1023007 | 9/1963 | United Kingdom . |

Primary Examiner—Jacqueline V. Howard
Attorney, Agent, or Firm—Burns, Doane, Swecker & Mathis, L.L.P.

[57] ABSTRACT

Lubricated rolling contact devices, especially full ceramic or hybrid ceramic rolling bearings, are designed so that the ceramic contact surface or surfaces are coated with a thin film formed from titanium dioxide in anatase form. The titanium dioxide film can be applied from a composition including particles of the titanium dioxide in grease or oil.

17 Claims, 1 Drawing Sheet

LUBRICATED ROLLING CONTACT DEVICES, A METHOD FOR LUBRICATING ROLLING CONTACT DEVICES, AND A COMPOSITION FOR LUBRICATING ROLLING CONTACT DEVICES

FIELD OF THE INVENTION

The present invention relates to lubricated rolling contact devices, a method for lubricating rolling contact devices, and a composition suitable for lubrication of such devices. More particularly, the present invention relates to lubricated devices, especially full ceramic or hybrid ceramic rolling bearings, wherein the ceramic contact surface or surfaces are coated with a thin film formed from titanium dioxide in the anatase form.

BACKGROUND OF THE INVENTION

In the field of rolling bearings, conventional liquid lubricants, such as grease or oil, are generally fully satisfactory for steel bearings. However, the same lubricants most often are not fully satisfactory for full ceramic and hybrid ceramic rolling bearings. Rolling bearings which are either all ceramic or hybrid ceramic (i.e., with ceramic rolling elements and steel rings), have been developed for increased bearing performance, high performance at high loads and high speeds, and in applications and environments which may pose particular demands due to high temperatures and other factors. These bearings are used in fields such as machine tools, vacuum pumps, gas turbines etc., and the ceramic material is predominantly silicon nitride, although other ceramics, for example silicon carbide, are also used to some extent. For improved tribological performance of ceramics in general, special liquid lubricants comprising additives to decrease thermal breakdown of the lubricant have been tested, but the major interest has been in solid lubrication.

For the specific purpose of lubrication of ceramics in rolling bearings, different solid lubricants have been suggested and used, among these are, for example, molybdenum disulphide and chromic oxide, the latter being known for example from U.S. Pat. No. 4,934,837. However, these lubricants are not entirely satisfactory in all aspects. Molybdenum sulphide, for example, does not have sufficient chemical stability for applications based on high rotational speeds and is not entirely satisfactory from an environmental point of view.

SUMMARY OF THE INVENTION

Generally speaking, the present invention relates to lubricated devices, especially full ceramic or hybrid ceramic devices comprising ceramic rolling elements and ceramic or steel rings, respectively. The contact surfaces of the ceramic part or parts of the device are coated with a thin film formed from titanium dioxide in the anatase phase. The present invention also involves a ceramic rolling element used in a rolling contact device and coated with a thin lubricating, wear and friction reducing film formed from titanium dioxide in the anatase form.

Another aspect of the present invention involves a method for lubricating a ceramic contact surface of a rolling contact device that involves applying titanium dioxide in the anatase phase to the ceramic contact surface to form a lubricating and friction reducing film comprising the titanium dioxide on the contact surface.

The present invention also relates to a composition suitable for lubricating a ceramic part of a rolling contact device, wherein the composition is comprised of a mixture of a lubricating organic grease or oil and particles of titanium dioxide in the anatase phase. The amount of particles in the grease or oil is preferably from 0.25 to 25 per cent by volume.

According to the present invention, it has been found that very satisfactory tribological properties are obtained if a certain metal oxide, namely titanium dioxide (titania, $TiO_2$), in the anatase form, is used for lubrication of rolling contact devices based entirely or partly on ceramic materials. The lubricated rolling contact devices encompassed by the present invention include ball bearings, roller bearings and cam roller followers.

BRIEF DESCRIPTION OF THE DRAWING FIGURES

The foregoing and additional features associated with the present invention will become more apparent from the following detailed description considered with reference to the drawing figures in which like elements are designated by like reference numerals and wherein.

DETAILED DESCRIPTION OF THE INVENTION

Figure 1:
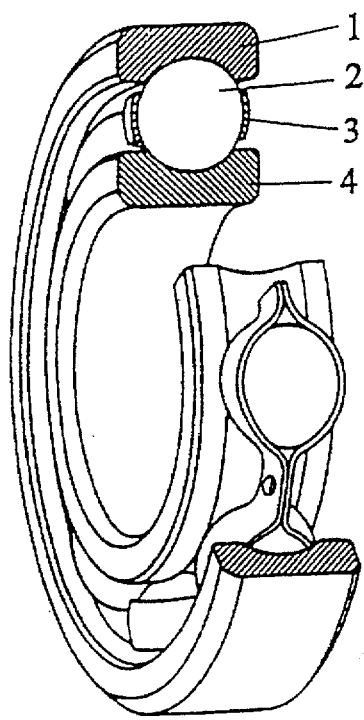
FIG. 1 is a perspective view, partially cut away, of a ball bearing according to the present invention.

The following description will primarily be directed to rolling bearings, but the same principles and processes are applicable to cam roller followers, which comprise a ceramic rolling element and a camshaft of steel. The titanium dioxide in anatase form used according to the present invention has been found to be a highly satisfactory lubricant for the ceramic contact surfaces with regard to wear, owing to, among other things, the relatively high hardness difference between a film formed from the oxide and the substrate surface and to the excellent adhesion between the oxide and the substrate. The titania particles are also advantageous from an environmental point of view and possess high chemical stability.

The actual bearings encompassed by the present invention are either full ceramic or hybrid ceramic rolling bearings, i.e. ball bearings or roller bearings, wherein either both the rolling elements and the inner and outer rings are made of ceramic material or only the rolling elements are made of ceramic material while the rings are made of steel. The ceramic material in the rolling bearings, and in the rolling element of a cam roller follower, is most often silicon nitride, since this ceramic is superior with regard to the combination of different desired properties, although other engineering ceramics of course can be used, for example silicon carbide, zirconium oxide and aluminum oxide. The silicon nitride of the bearing parts may, as is conventional, contain additives, such as for example aluminum oxide, magnesium oxide and/or yttrium oxide to improve sintering. Such additives are usually used in amounts of up to about 10 per cent by weight. According to a preferred embodiment of the present invention, the rolling bearings are hybrid bearings with rolling elements of ceramic material, especially of silicon nitride, coated with a film of titanium dioxide in the anatase phase.

According to the present invention the ceramic contact surfaces, i.e. the raceways of a bearing and/or the rolling elements of a bearing or the rolling element of a cam roller follower, are coated with a thin, lubricating and friction-reducing film formed from titania in the anatase phase. The film on the lubricated surfaces is substantially continuous and usually has a thickness within the range of from 0.01 µm to 10 µm. For full ceramic bearings, the oxide can be applied both to the two raceways and the rolling element or to either the raceways or the rolling elements. If both the rolling elements and the raceways are lubricated according to the present invention, the film thickness is usually adjusted so that the total thickness of the two films in contact does not exceed 10 µm. Hybrid bearings are preferred, as stated above, and the rolling elements are then coated with the titania film of the given thickness range.

The titanium dioxide may be applied on the desired surfaces for example by a CVD (chemical vapour deposition) or PVD (physical vapour deposition) process. Titanium dioxide can, for example, be applied by deposition of titanium nitride which is then oxidized in air or in oxygen atmosphere at temperatures of about 800 to 1200° C. It is, however, preferred to deposit the oxide on the surfaces using a lubricating, liquid or semi-solid material as a carrier for solid titanium dioxide particles. The carrier may be any conventionally used lubricating oil or grease such as, for example, mineral oils, vegetable oils, diester oils. These oils are usually used with conventional thickeners such as lithium and/or calcium soaps. Even if the carrier imparts a certain lubricating affect in itself, the long-term lubricating, friction-reducing and wear resistance improving effect is obtained from the titania particles, which adhere to the ceramic surfaces, and their formation of an essentially coherent film on these surfaces.

Titania of the anatase phase has among other things, hardness properties which give the required hardness difference between the film and the substrate surface. It has further been found that the particles have an excellent affinity to ceramic surfaces and that they form the desired comparatively soft films on the surfaces, which reduce the friction in the contact areas.

For the formation of the layer of the surface film of titania in the anatase phase, the particles have to deform plastically in the contact region between the rolling element and the other surface. To effect plastic deformation of the particles, the particles must be below a critical particle size, the brittle ductile transformation size. For particles of titania in the anatase phase, the critical particle size can be calculated to below about 10 µm.

The hardness difference between titanium dioxide and the substrate surface and the contact surface is believed to contribute to the highly satisfactory tribological results associated with the present invention. The use of titanium dioxide of the anatase phase is especially advantageous in order to increase the hardness difference between the materials. The hardness of the rutile form of titanium dioxide is about double that of the anatase form. In addition, the hardness of the anatase form is lower than that of tempered steel used in bearing surfaces and the wear of these surfaces in hybrid bearings is thus reduced. The comparatively low hardness of anatase particles also makes it possible to use a larger particle size for the applied particles.

The particle size of the applied anatase particles usually does not exceed 10 µm in order to give plastic deformation at pressure contact. The particle size is preferably up to about 5 µm. The fact that larger particles of titanium dioxide can be used is also advantageous, since there is a risk that the particles will be embodied in the film of oil or grease and not adhere sufficiently to the ceramic surface if the particle size is too small. The particle size should preferably not be below 0.01 µm and preferably not below 0.1 µm. It is especially preferred that the particle size is at least 1 µm.

The oil or grease containing the titania particles can be applied to the surfaces to be lubricated in a conventional manner, such as by the use of grease guns, pumped oil lubrication systems, aerosol lubrication systems etc. The titanium dioxide surface film can also be applied by a process wherein the parts are rolled or tumbled in a slurry of the particles and the parts can then be mounted in the device wherein they will be used and optionally then treated with conventional grease and/or oil lubricants. The lubricated rolling bearings of the present invention comprise ceramic rolling elements and ceramic or steel rings with the ceramic bearing contact surfaces coated with a thin film formed from the titania of the anatase phase and they further comprise a case or housing as conventional. The bearings may also be sealed or shielded, i.e., may be lubricated for life. For certain applications, it might also be possible to apply short treatment periods with the particles to re-build possibly damaged surface layers without removing the bearings from the rolling contact system. Under normal running conditions, conventional lubricants which do not contain the anatase particles can be applied if so desired.

The present invention also relates to a method for lubricating a rolling contact device, full ceramic or hybrid ceramic rolling bearing including ceramic rolling elements and ceramic or steel rings, respectively, or the ceramic rolling element of a cam roller follower. The method involves applying titanium dioxide of the anatase phase to the ceramic contact surfaces for formation of a thin lubricating and friction-reducing film comprising the titania on the surfaces. Possible and preferred methods and materials for applying the film are described above. The lubrication according to the present invention can be carried out at or before assembly and as a permanent lubrication.

The invention further relates to a composition suitable for lubricating rolling contact devices as described above. The composition comprises a mixture of a lubricating organic grease or oil and particles of titanium dioxide of the anatase phase. The amount of particles in the grease or oil is preferably from 0.25 to 25 per cent by volume, preferably from 2 to 10 per cent by volume. The grease or oil can be any known such material, for example those mentioned above.

The invention additionally relates to a rolling element, lubricated in accordance with the invention, and especially to such a rolling element in tribological contact.

Figure 2:
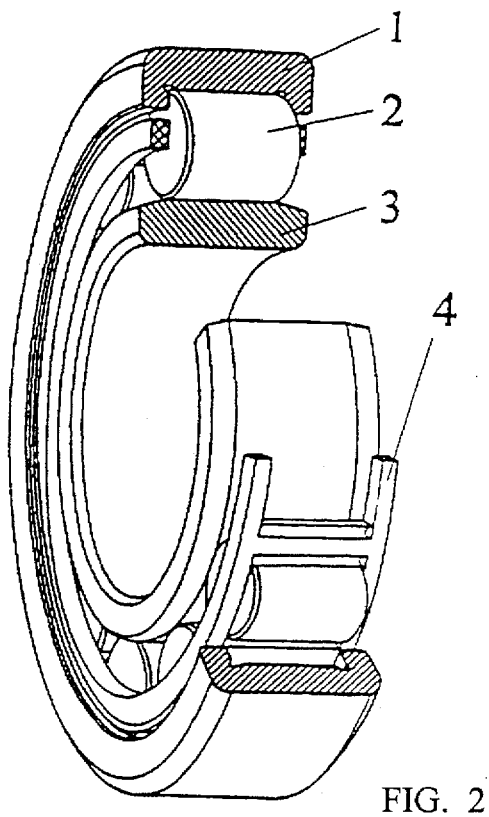
FIG. 2 is a perspective view, partially cut away, of a roller bearing according to the present invention.
Figure 3:
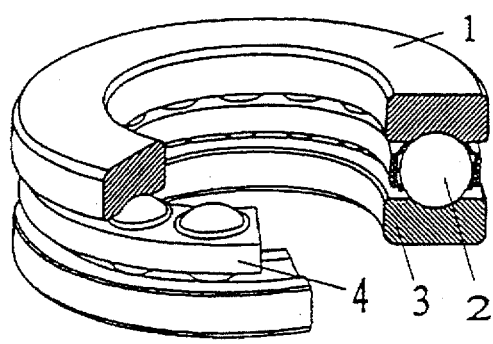
FIG. 3 is a perspective view, partially cut away, of a thrust bearing according to the present invention.
Figure 4:
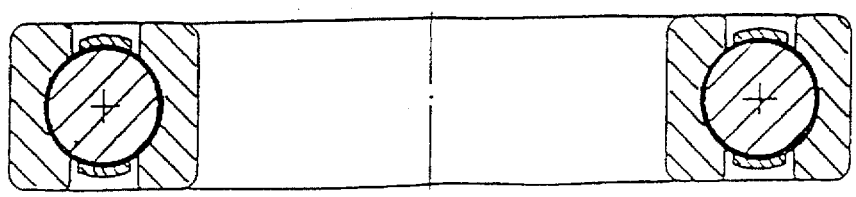
FIG. 4 is cross-sectional view of a ball bearing according to the present invention showing balls provided with a thin anatase layer in accordance with the present invention.

The drawing figures illustrate examples of ways in which the present invention can be employed in practice. As seen with reference to FIG. 1, a ball bearing is provided with titania coated balls 2 between the outer ring 1 and the inner ring 4. The bearing further comprises a cage 3. FIG. 2 illustrates a roller bearing with anatase coated rollers 2 between the outer ring 1 and the inner ring 3. The bearing is also equipped with a cage 4. FIG. 3 shows a thrust bearing with a cage 4 and with anatase coated balls 2 between the upper ring/race 1 and the lower ring/race 3.

The invention is further illustrated by way of the following examples which, however, are not intended to limit the invention.

EXAMPLE

For comparison of the effect of titania ($TiO_2$) in the anatase phase, as a lubricant for all steel and hybrid bearings, tests with rolling elements of silicon nitride were made according to Table 1. The tested bearing was of a thrust bearing design (SKF#51036), with a steel cage normally accommodating ten balls. For the test series the bearings were run reduced with 5 balls in each test and with the maximum rated axial load for the test machine applied, 3560

Newton, to achieve working conditions under boundary lubrication. The used carrier/lubricant (SKF LGMT3) was a grease based on mineral oil and with a thickener of lithium soap. Titania particles of anatase structure were added to the grease in tests 3 and 4. The grease and grease-titania mixture was introduced in the cage in an amount of 5.1 g in each test. The particles had a size within the range of from 0.1 to 5 μm and a median size of 0.5 μm. The tests were conducted at full speeds in the range of 2050 to 2070 rpm. The wear of the bearings was recorded by weight measurements. It should be mentioned that during the tests the essential contact is rolling contact but that there is also a sliding contact component to the cage in the bearing. All parts of the bearings were ultrasonically cleaned in acetone and weighed on a micro-scale, before and after the tests. The surfaces of the steel races, cages, steel balls and ceramic balls were examined both before and after the tests by optical microscopy and scanning electron microscopy. Under the tests, race temperature was measured on the back side of the upper race and rotations by an electronic counter.

Table I. Test series for evaluation of titania, anatase phase, as lubricant for roller bearings.

Test 1. All steel bearing test with grease lubrication under boundary conditions. 5,964,000 rotations or about 50 hours total test time.

Test 2. Hybrid bearing test (ceramic balls) with grease lubrication under boundary conditions. 5,964,000 rotations or about 50 hours total test time.

Test 3. All steel bearing test with grease lubrication under boundary conditions, with 2.5 volume percent titania added. 5,977,000 rotations or about 50 hours total test time.

Test 4. Hybrid bearing test (ceramic balls) with grease lubrication under boundary conditions, with 2.5 volume percent titania added. 5,964,000 rotations or about 50 hours total test time.

The tests gave the following results for weight losses and gains of bearings parts:

Test 1. Steel races and cage—Steel balls—Grease

| Part | Before test [g] | After test [g] | Difference [mg] |
| --- | --- | --- | --- |
| Upper Race | 97.2444 | 97.2452 | +0.8 |
| Lower Race | 91.6684 | 91.6688 | +0.4 |
| Cage | 16.9523 | 16.9496 | −2.7 |
| Balls (5) | 22.3537 | 22.3533 | −0.4 |

Test 2. Steel races and cage—Ceramic balls—Grease

| Part | Before test [g] | After test [g] | Difference [mg] |
| --- | --- | --- | --- |
| Upper Race | 97.4962 | 97.4968 | +0.6 |
| Lower Race | 91.2834 | 91.2822 | −1.2 |
| Cage | 16.9593 | 16.9497 | −9.6 |
| Balls (5) | 9.3098 | 9.3100 | +0.2 |

Test 3. Steel races and cage—Steel balls—Grease with titania

| Part | Before test [g] | After test [g] | Difference [mg] |
| --- | --- | --- | --- |
| Upper Race | 97.6868 | 97.6868 | ±0 |
| Lower Race | 91.6120 | 91.6112 | −0.8 |
| Cage | 17.0973 | 17.0873 | −10.0 |
| Balls (5) | 22.3480 | 22.3464 | −1.6 |

Test 4. Steel races and cage—Ceramic balls—Grease with titania

| Part | Before test [g] | After test [g] | Difference [mg] |
| --- | --- | --- | --- |
| Upper Race | 96.6480 | 97.6496 | +1.6 |
| Lower Race | 91.2482 | 91.2494 | +1.2 |
| Cage | 16.8713 | 16.8697 | −1.6 |
| Balls (5) | 9.3131 | 9.3135 | +0.4 |

As can be seen, the results from test 4 evidence a lower wear as compared to tests 1, 2 and 3. The most significant change is in the cage wear: 625% higher in test 3 compared to test 4; 600% higher in test 2 compared to test 4; and 168% higher in test 1 compared to test 4. No weight losses were recorded on the races or balls in test 4. A slight weight gain was recorded on these parts due to titania on the surfaces. For the balls, this was of large significance as it formed thin soft solid films.

Under the test series, the upper race temperature was recorded and after the initial stabilization of the systems a stable level could be recorded for all tests. The hybrid bearings race temperature was reduced by 7° C. from an average 82° C., in test 2, to 75° C., in test 4, by the addition of titania. The temperature level in test 4 was under the all steel bearing tests, test 1 and test 3. The use of titania in an all steel bearing gave a slight rise in temperature from 77° C., in test 1, to 79° C., in test 3.

EXAMPLE 2

In this test series, the same thrust bearing test machine, loading and grease as in Example 1 were used. The test machine was run at 1900 rpm and the differential temperature between the upper race and room temperature was recorded. The thrust bearings were run reduced with five silicon nitride balls in each test. Conventional bearing steels were used in the cage and race pans. Each test was run first for 90 minutes and after cooling to room temperature the test was restarted and run for a total of 600 minutes. The temperatures of the upper races were recorded after 220 minutes and 600 minutes. In test 2a, the hybrid bearings were run with pure grease without any particle addition. In test 2b, titanium dioxide in the anatase phase was added with 2.5 vol % of $TiO_2$ in mixture with grease. The added particles were in a size range of about 0.1 to 5 μm. In test 2c, a comparison was made with titanium dioxide of the rutile phase. The amount of particles used and the size range was the same as in test 2b. The results are shown in the following table.

TABLE

| Test No. | Differential temp. after 220 min (°C.) | Differential temp. after 600 min (°C.) |
| --- | --- | --- |
| 2a - no particles | 60.3 | 59.5 |
| 2b - anatase | 55.5 | 54.8 |
| 2c - rutile | 55.5 | 59.5 |

From the above table, it can be seen that the bearing temperature was reduced over a prolonged time period when $TiO_2$ in the anatase phase was used. $TiO_2$ in the rutile phase gave corresponding results as the anatase at 220 minutes, but was clearly inferior after 600 minutes when the results were at the same level as for the reference with only grease and no particles.

EXAMPLE 3

In this example the influence of different amounts of titanium dioxide particle of the anatase phase was studied.

The same thrust bearing test machine, loading and grease as in Examples 1 and 2 were used. The test machine was run at 1900 rpm and the differential temperature between the upper race and room temperature was recorded. The thrust bearings were run reduced with five silicon nitride balls in each test. Conventional bearing steels were used in the cage and the race parts. Each test was run in intervals of 90 minutes and the test was re-started after cooling below a differential temperature of 18° C. A total of six runs were made in each test, equal to 540 minutes total test time for each bearing. The end differential temperature of the last run in each test was recorded. The following compositions were tested:

3a) Pure grease without particle addition.
3b) Mixture of grease and 1.0 volt TiO$_2$ in the anatase phase.
3c) Mixture of grease and 2.5 volt TiO$_2$ in the anatase phase.
3d) Mixture of grease and 5.0 vol% TiO$_2$ in the anatase phase.

The results are shown in the table below.

TABLE

| Test No. | Differential temperature (°C.) |
|---|---|
| 3a | 60.8 |
| 3b | 59.5 |
| 3c | 56.3 |
| 3d | 55.2 |

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A lubricated rolling contact device, comprising at least one rolling element provided with a ceramic contact surface, the ceramic contact surface of the device being coated with a thin lubricating, wear and friction reducing film formed from titanium dioxide in the anatase phase.

2. Rolling contact device according to claim 1, wherein the film of titanium dioxide is formed from particles having a particle size of up to about 10 μm.

3. Rolling contact device according to claim 1, wherein the film of titanium dioxide is formed from particles having a size of from 0.01 μm to about 5 μm.

4. Rolling contact device according to claim 1, wherein the lubricated rolling contact device is a hybrid ceramic rolling bearing with ceramic rolling elements and steel rings.

5. Rolling contact device according to claim 1, wherein the ceramic contact surface of the device is made of Si$_3$N$_4$.

6. Rolling contact device according to claim 1, including an inner ring and an outer ring made of ceramic material, the inner ring and the outer ring having a raceway coated with titania in the anatase phase.

7. A method for lubricating a ceramic contact surface of a rolling contact device, comprising applying titanium dioxide in the anatase phase to the ceramic contact surface to form a lubricating and friction reducing film comprising the titanium dioxide on the contact surface.

8. A method according to claim 7, wherein the step of applying titanium dioxide to the contact surface involves applying titanium dioxide in combination with an organic lubricating grease.

9. A method according to claim 7, wherein the step of applying titanium dioxide to the contact surface involves applying titanium dioxide in combination with an organic lubricating oil.

10. A method according to claim 7, wherein the titanium dioxide is applied in an amount to provide a substantially continuous film having a thickness of from 0.01 μm to 10 μm.

11. A method according to claim 7, wherein the step of applying titanium dioxide to the contact surface involves applying anatase particles have a particle size of up to about 5 μm.

12. A method according to any of claim 7, wherein the rolling contact device is a hybrid ceramic rolling bearing with ceramic rolling elements and steel rings.

13. A composition suitable for lubricating a ceramic part of a rolling contact device, comprising a mixture of a lubricating organic grease or oil and particles of titanium dioxide in the anatase phase, the amount of particles in the grease or oil being from 0.25 to 25 per cent by volume.

14. A composition according to claim 13, wherein the titanium dioxide particles have a particle size of from 0.01 μm to about 5 μm.

15. An element for use in a rolling contact device, comprising a ceramic rolling element coated with a thin lubricating, wear and friction reducing film formed from titanium dioxide in the anatase form.

16. An element according to claim 15, wherein the film has a thickness of from 0.01 μm to 10 μm.

17. An element according to claim 15, wherein said ceramic rolling element is in a tribological contact.

* * * * *